(12) United States Patent
Bailey et al.

(10) Patent No.: US 12,267,935 B2
(45) Date of Patent: Apr. 1, 2025

(54) EMERGENCY WAYFINDING TECHNOLOGY

(71) Applicant: Aclara Technologies, LLC, St. Louis, MO (US)

(72) Inventors: Christopher Bailey, Greenville, SC (US); Robert Walter Richardson, Saint Charles, MO (US)

(73) Assignee: Aclara Technologies, LLC, St. Louis, MO (US)

( * ) Notice: Subject to any disclaimer, the term of this patent is extended or adjusted under 35 U.S.C. 154(b) by 66 days.

(21) Appl. No.: 18/074,667

(22) Filed: Dec. 5, 2022

(65) Prior Publication Data
US 2023/0098131 A1 Mar. 30, 2023

Related U.S. Application Data

(63) Continuation of application No. 17/533,849, filed on Nov. 23, 2021, now Pat. No. 11,533,798.

(60) Provisional application No. 63/117,052, filed on Nov. 23, 2020.

(51) Int. Cl.
| | |
|---|---|
| *H05B 47/195* | (2020.01) |
| *F21S 9/02* | (2006.01) |
| *F21V 23/00* | (2015.01) |
| *H05B 45/10* | (2020.01) |
| *H05B 47/185* | (2020.01) |

(52) U.S. Cl.
CPC .......... *H05B 47/195* (2020.01); *F21S 9/022* (2013.01); *F21V 23/003* (2013.01); *H05B 45/10* (2020.01); *H05B 47/185* (2020.01)

(58) Field of Classification Search
CPC .... H05B 45/10; H05B 47/185; H05B 47/195; H05B 47/19; F21S 9/022
See application file for complete search history.

(56) References Cited

U.S. PATENT DOCUMENTS

| | | | |
|---|---|---|---|
| 8,461,991 B2 | 6/2013 | Botha | |
| 9,838,652 B2 | 12/2017 | Chien | |
| 10,230,880 B2 | 3/2019 | Chien | |
| 2014/0211487 A1 | 7/2014 | Spiro | |
| 2014/0265920 A1* | 9/2014 | Pederson | H05B 47/19 315/294 |
| 2014/0341588 A1* | 11/2014 | Pederson | F21V 23/003 398/128 |
| 2018/0306423 A1 | 10/2018 | Ando et al. | |
| 2019/0320515 A1 | 10/2019 | Sadwick | |
| 2019/0341732 A1* | 11/2019 | Aaron | H01R 33/90 |

OTHER PUBLICATIONS

PCT/US2021/60567 International Search Report and Written Opinion dated Feb. 28, 2022.

* cited by examiner

*Primary Examiner* — Monica C King
(74) *Attorney, Agent, or Firm* — Robinson + Cole LLP

(57) ABSTRACT

An emergency wayfinding device includes a lighting circuit constructed and arranged to change at least one property of a light emitted from a light emitting element, and an electrical conduit including a plug. The plug of the electrical conduit is constructed configured to be received in a socket and to draw electricity from the socket to power the lighting circuit via the electrical conduit.

20 Claims, 7 Drawing Sheets

EMERGENCY WAYFINDING TECHNOLOGY

RELATED APPLICATIONS

This application is a continuation of U.S. non-provisional patent application Ser. No. 17/533,849, filed Nov. 23, 2021, which is based on, and claims benefit of, U.S. provisional patent application 63/117,052, filed Nov. 23, 2020, and which is incorporated herein by reference.

FIELD

The embodiments disclosed herein relate to methods and products for indicating an emergency.

BACKGROUND

It is sometimes necessary to guide the public to safety during a crisis.

SUMMARY

In one embodiment, an emergency wayfinding device includes a lighting circuit constructed and arranged to change at least one property of a light emitted from a light emitting element, and an electrical conduit including a plug. The plug of the electrical conduit is constructed configured to be received in a socket and to draw electricity from the socket to power the lighting circuit via the electrical conduit.

In one embodiment, an emergency wayfinding device includes a lighting controller configured to send and receive wireless communications, and a first electrical conduit including a first plug connected to the lighting controller and configured to deliver power to the lighting controller via the first electrical conduit by drawing power from a first socket into which it is received.

In one embodiment, an emergency wayfinding device includes an enclosure, a first light emitting element, a lighting circuit configured to change at least one property of a light emitted from the first light emitting element, and a first electrical conduit including a first plug connected to the lighting circuit.

Other aspects of the technology will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. As used within this document, the word "or" may mean inclusive or. As a non-limiting example, if it we stated in this document that "item Z may comprise element A or B," this may be interpreted to disclose an item Z comprising only element A, an item Z comprising only element B, as well as an item Z comprising elements A and B.

A plurality of hardware and software-based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces (I/O interfaces), one or more application specific integrated circuits (ASICs), and various connections (for example, a system bus) connecting the various components.

Figure 1:
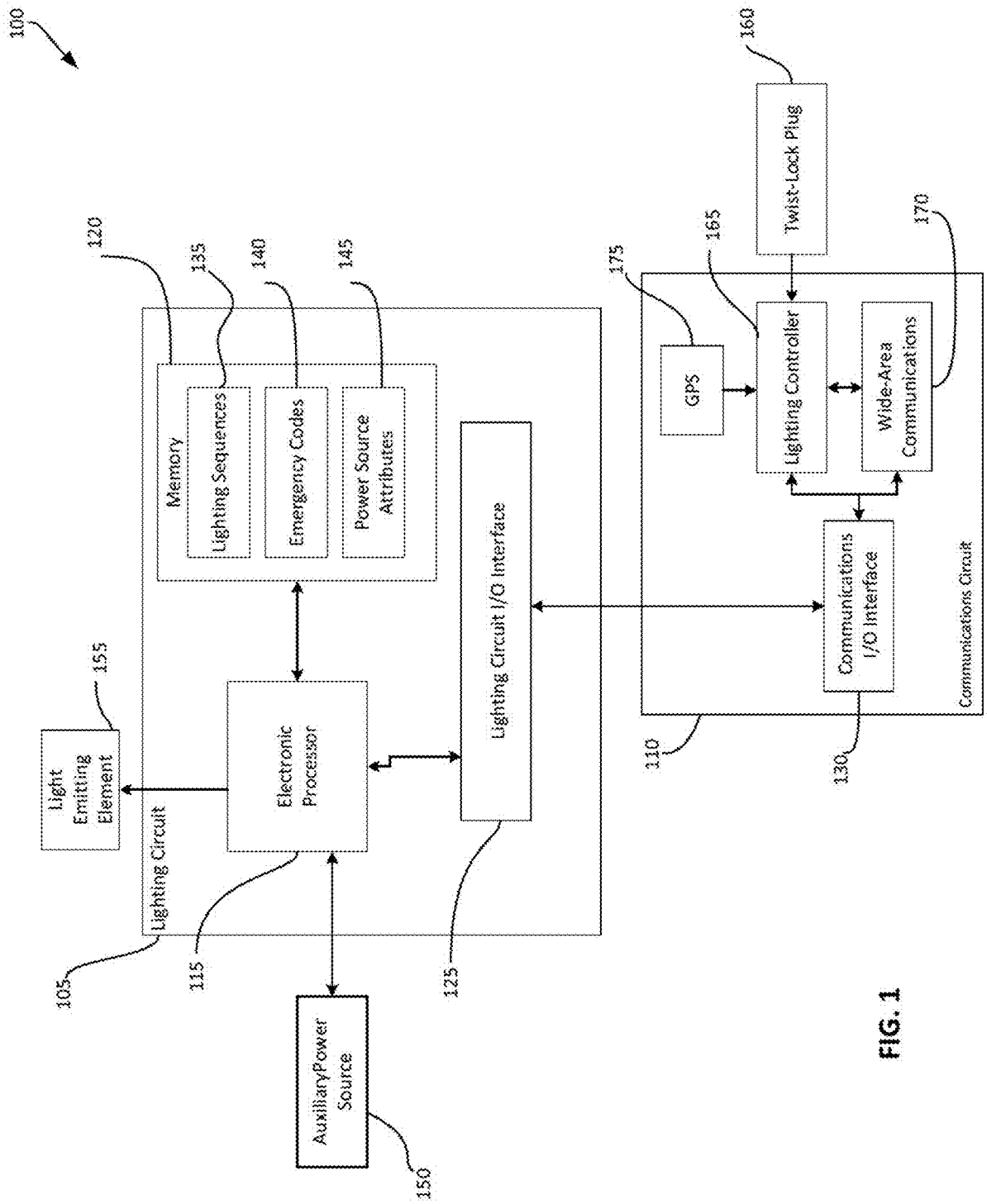
FIG. 1 depicts a block diagram of an emergency wayfinding system capable of wide-area communications.

FIG. 1 is a block diagram of an emergency wayfinding system 100 incorporating a lighting circuit 105 and a communications circuit 110. The lighting circuit 105 includes a plurality of electrical and electronic components that provide power, operation control, and protection to the components and modules within the lighting circuit 105. Likewise, in some embodiments, the communications circuit 110 includes a plurality of electrical and electronic components that provide power, operation control, and protection to the components and modules within the communications circuit 110. In the example illustrated, the lighting circuit 105 may include, among other things, an electronic processor 115 (such as a programmable electronic microprocessor, microcontroller, distributed or local multi-processor, or similar device), a memory 120 (for example, non-transitory, machine-readable memory), and an lighting circuit I/O interface 125.

The electronic processor 115 is communicatively connected to the memory 120 and the lighting circuit I/O interface 125, and the lighting circuit I/O interface 125 is communicatively connected to the communications I/O interface 130 of the communications circuit 110. In some embodiments, the memory 120 includes lighting sequences 135, emergency codes 140 indicating a type of emergency, and power source attributes 145. The lighting sequence 135 may be instructions in memory 120 executable to implement a lighting sequence 135 including a lighting pattern or color via a light emitting element 155. During execution by the lighting circuit 105, lighting sequence 135 instructions may take the emergency codes 140 and wayfinding unit coordinates (not shown) as input. The lighting circuit I/O interface 125 of the lighting circuit may also obtain input received via the communications I/O interface 130 of the communications circuit 110, and provide the input to the electronic processor 115, for example, prior to or during the execution of the lighting sequence 135 instructions.

In the embodiment shown, the electronic processor 115 and memory 120 are shown as included in the lighting circuit 105. However, in other embodiments, the electronic processor 115 and memory 120 are included in the communications circuit 110. In still other embodiments, an electronic processor 115 and memory 120 are included in both the lighting circuit 105 and the communications circuit 110.

The emergency wayfinding system 100 draws electricity through a twist-lock plug 160, and provides power to communications circuit 110 including a photocontroller or smart lighting controller 165, and a wide-area communications device 170. In some cases, the twist-lock plug 160 acts as an electrical conduit for an AC signal. In other cases, the twist-lock plug 160 acts as an electrical conduit for a low-power DC signal. In the embodiment shown, the communications circuit 110 draws electricity through the twist-lock plug 160, but in other embodiments, the lighting circuit 105 draws electricity through the twist-lock plug 160. Also, in the embodiment shown, a GPS unit 175 is included in the communications circuit 110 but may also be included in the lighting circuit 105 in other embodiments. The photocontroller or smart lighting controller 165 is configured to generate lighting control messages or signals interpretable by the electronic processor 115. The photocontroller or smart lighting controller 165 may build these control messages based on messages, signals, or data provided to it by the wide-area communications device 170 or the GPS unit 175. In some cases, the photocontroller or smart lighting controller 165 may generate control messages based on input from other sources such as sensors (not shown).

In some cases, the emergency wayfinding system 100 may determine its own coordinates in ways that do not depend on the use of GPS unit 175. For example, the communications circuit 110 or lighting circuit 105 may contain a chip or radio for communicating with a device of an installing technician. In such a case, the technician's device may know its own coordinates. At installation, of the emergency wayfinding system 106 the coordinates of the technician's device may be retrieved by the chip or radio of the communications circuit 110 or lighting circuit 105, or transferred to the chip or radio of the communications circuit 110 or lighting circuit 105 by the technician's device. The emergency wayfinding system 100 may thereafter use the transferred or retrieved coordinates, or a modified version thereof, as its own coordinates. In other cases, the emergency wayfinding system may determine its coordinates by a triangulation method, or via updates using a connection to a cloud or a cooperative network of emergency wayfinding systems or smart devices. Thus, in some cases, a GPS unit 175 is not included or necessary in the emergency wayfinding system 100, and an emergency wayfinding device may determine its own coordinates via a non-GPS device or method, if the coordinates of the emergency wayfinding system 100 are needed for the building of the control messages discussed above.

The lighting circuit 105 and communications circuit 110 may be included in the same electronic circuit. In such a case, the lighting circuit I/O interface 125 of the lighting circuit 105 and the communications I/O interface 130 of the communications circuit 110 may not be necessary. Where the lighting circuit I/O interface 125 and communications I/O interface 130 are not present, the lighting circuit 105 and communications circuit 110 may communicate directly one another via electrical communication (e.g., electronic bus, wire, electrical contacts, etc.). Where present, the lighting circuit I/O interface 125 and communications I/O interface 130 together facilitate wireless communication between the lighting circuit 105 and the communications circuit 110 (e.g., short-wave radio, Bluetooth communication, infrared bi-directional link, magnetic coupling, audio coupling, piezo-electric transmitter/receiver pairs, optical link, etc.).

The wide-area communications device 170 of the communications circuit 110 may use any two-way automatic communication system (TWACS), a radio system, utility-grade power line communications, a cellular system such as 2G, 3G, 4G or 5G, optical link such as an infrared bi-directional link, wifi communication, or any other method of wide-area communications. The wide-area communications device 170 may send signals or messages to and receive signals or messages from a central broadcasting device or station, or other emergency wayfinding devices.

The memory 120 may be housed on the same board or device as the lighting circuit 105 or communication circuits 110, or may be part of a remote computing system accessible over a network such as, but not limited to, a cloud computing service or a web service, or a combination thereof. Similarly, the memory 120 may be volatile or non-volatile memory, or a combination thereof and may also be locally accessible or remotely accessible over a network via a cloud storage service or data center. The electronic processor 115, in coordination with the memory 120 the lighting circuit I/O interface 125, and the light emitting element 155 may thus be configured to implement, among other things, the methods described herein. Functions described herein as being performed as lighting sequences 135 and emergency codes 140 should be understood to, at least in some embodiments, be performed by the electronic processor 115 executing lighting schemes generated by the lighting circuit or control signals or messages generated by the lighting controller 165.

The auxiliary power source 150, when present, may provide electricity to the emergency wayfinding system 100, light emitting element 155, and the communications circuit 110 and the lighting circuit 105. The auxiliary power source 150 may be a battery, a renewable power source (e.g., solar panel, wind turbine, etc.), or some other power source. Memory 120 may store power source attributes 145 describing the power attributes (voltage, current, etc.) of the auxiliary power source 150 or twist-lock plug 160.

Figure 2:
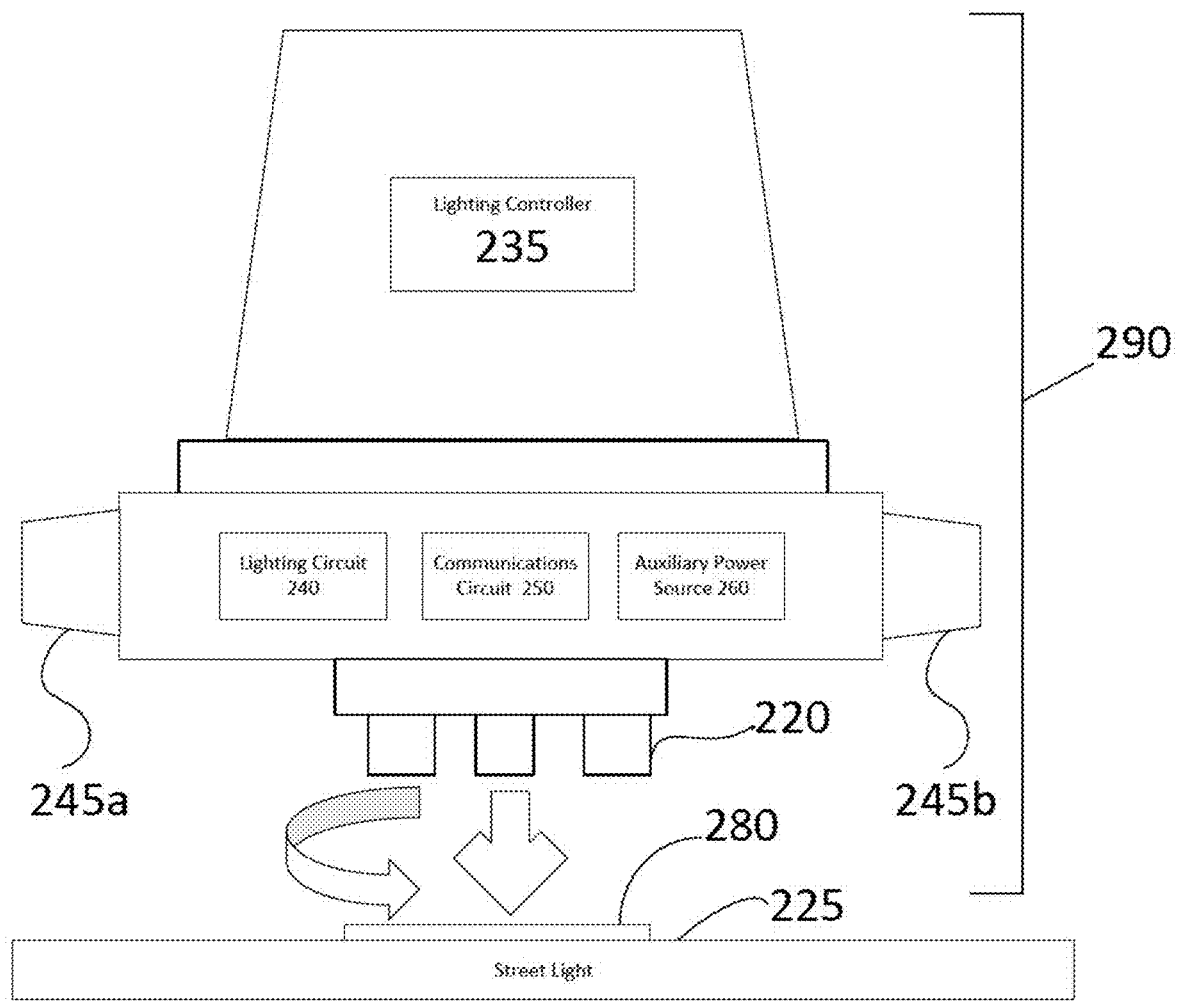
FIG. 2 depicts an emergency wayfinding system wherein a lighting circuit and a wayfinding circuit are disposed in a single enclosure that plugs into a street light.

FIG. 2 shows a first configuration for an emergency wayfinding system 200. In the embodiment shown, the emergency wayfinding system 200 includes a lighting circuit 240 and communications circuit 250 in a single enclosure 290. The single enclosure 290 comprises a lighting circuit 240, a communications circuit 250, and a lighting controller 235. The lighting controller 235 is configured to control light emission by a street light 225 and in some cases to aid a lighting circuit 240 of the wayfinding circuitry enclosure 210 in controlling the light emission of at least one light emitting element 245a or 245b. Light emitting elements 245a or 245b, emit colored visible light are disposed on sides of the single enclosure 290. In addition, light emitting elements 245a or 245b are communicatively connected to the communications circuit 250 and the lighting circuit 240. The communications circuit 250 includes a wide area communications device 170 and may also include a GPS unit 175. In this embodiment, each component described may be powered by electricity drawn from the street light 225 via twist-lock plug 220.

The communications circuit 250 may receive an over-the-air communication via the wide-area communications device 170 indicating that an emergency wayfinding light sequence or color should be emitted by the at least one light emitting element 245a or 245b. The communications circuit 250 relays this communication to the lighting circuit 240, where a control scheme for executing a proper lighting sequence 135 and color is devised. The control scheme is executed by the lighting circuit 240 which drives the at least one light emitting element 245a or 245b, to turn on or off, or emit light in a sequence or color in keeping with the devised control scheme. In embodiments wherein lighting controller 235 is a photocontroller, a devised control scheme may be limited to causing a blinking of the at least one light emitting element 245a or 245b. It is also possible, in some embodiments, that the lighting controller 235 generates a control signal or message for the control of a light emitting element in a device such as the street light 225 into which the twist-lock plug 220 of the single enclosure 290 is installed.

In the embodiment shown, the single enclosure 290 includes an auxiliary power source 260, for example, a battery or a connection to a power source beside the twist-lock receptacle of the street light 225. The auxiliary power source 260 is configured to deliver electricity to the lighting circuit 240 and communications circuit 250 when electricity is not being drawn through the twist-lock plug 220. In embodiments wherein the auxiliary power source 260 is a battery, the auxiliary power source 260 may be configured to charged when electricity is being drawn through the twist-lock plug 220.

Figure 3:
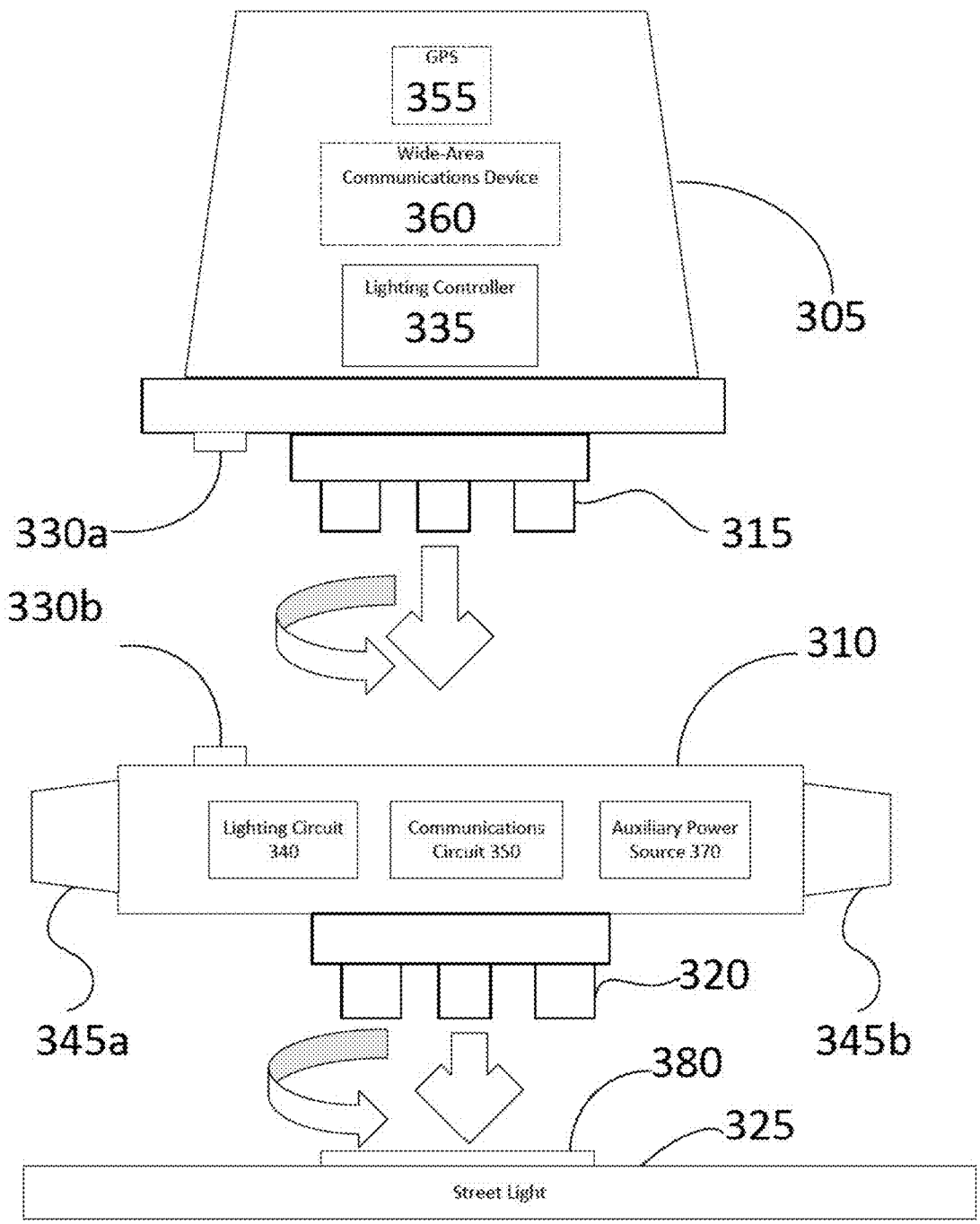
FIG. 3 depicts an emergency wayfinding system wherein a lighting controller enclosure plugs into a wayfinding circuitry enclosure, and the wayfinding circuitry enclosure plugs into a street light.

FIG. 3 shows a second configuration for the emergency wayfinding system 300. In the embodiment shown, a lighting controller enclosure 305 is installed into a wayfinding circuitry enclosure 310 via a twist-lock plug 315. The wayfinding circuitry enclosure 310 also comprises a second twist-lock plug 320 that may be installed into a twist-lock socket 380 of a street lamp and draw electricity therefrom. The twist-lock plug 315 and second twist-lock plug 320 facilitate the transmission of electricity between the lighting controller enclosure 305, the wayfinding circuitry enclosure 310, and the street light 325. A first bi-directional data transfer port 330a and a second bi-directional data transfer port 330b facilitate data transfer between the lighting controller enclosure 305 and the wayfinding circuitry enclosure 310. The lighting controller enclosure 305 comprises a lighting controller 335 configured to control light emission by a street light 325 and in some cases to aid a lighting circuit 340 of the wayfinding circuitry enclosure 310 in controlling the light emission of at least one light emitting element 345a or 345b. Light emitting elements 345a and 345b are disposed on the wayfinding circuitry enclosure 310, and are communicatively connected to a communications circuit 350 and the lighting circuit 340. In the embodiment shown, the communications circuit 350 is housed by the wayfinding circuitry enclosure 310 and includes a wide area communications device 170 and may also include a GPS unit 355. Likewise, in embodiments wherein the lighting controller enclosure 305 is a smart controller, the lighting controller enclosure 305 may include a GPS unit 355 and a wide-area communications device 360. In the embodiment shown, each component described may be powered by electricity drawn from the street light 325 via second twist-lock plug 320 or 315.

The communications circuit 350 may receive an over-the-air communication via the wide-area communications device 360 or, in some embodiments wide-area communications device 170, indicating that an emergency wayfinding light sequence or color should be emitted by the at least one light emitting element 345a, 345b. The communications circuit 350 relays this communication to the lighting circuit 340, where a control scheme for executing a proper lighting sequence 135 and color is generated. The lighting control scheme is then executed by the lighting circuit 340 of the wayfinding circuitry enclosure 310 and drives the at least one light emitting element 345a, 345b, to turn on or off, or to emit light in a sequence or color in keeping with the control scheme devised by the lighting circuit 340. In embodiments wherein lighting controller enclosure 305 includes a photocontroller, control signals or messages may be generated for causing a turning off or turning on of the at least one light emitting element 345a, 345b. It is also possible, in some embodiments, that the lighting controller enclosure 305 generates a control signal or message for the control of a light emitting element in a device such as the street light 325 into which the second twist-lock plug 320 of the emergency wayfinding circuitry enclosure 310 is installed. In such cases, a lighting controller 335 of the lighting controller enclosure 305 generates a control message or signal for interpretation by the lighting circuit 340. The lighting controller enclosure 305 communicates the control message or signal via the bi-directional data transfer port 330a of the lighting controller enclosure 305 to the bi-directional data transfer port 330b of the wayfinding circuitry enclosure 310 via, for example, an electrical contact created by installing the twist-lock plug 315 into a receptacle of the wayfinding circuitry enclosure 310, an optical link created between the bi-directional transfer ports 330a, 330b when then the twist-lock plug 315 of the lighting controller enclosure 305 is installed into a receptacle of the wayfinding circuitry enclosure 310, or some other bi-directional data link. The lighting circuit 340 receives the control signal or message and drives at least the street light 325, to turn on or off, or to emit light in a sequence or color based upon the received control signal or message and the generated control scheme.

Figure 3A:
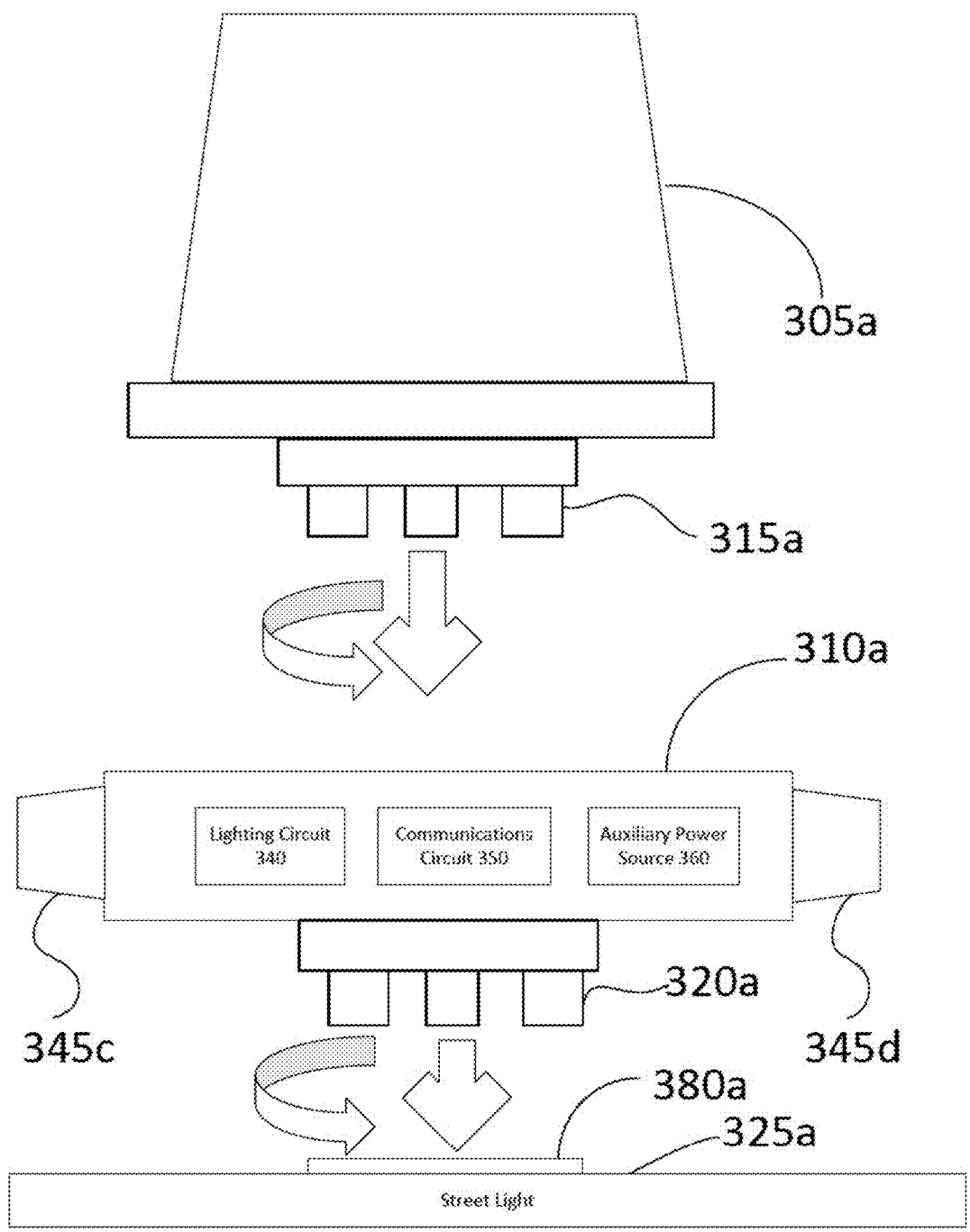
FIG. 3a depicts an emergency wayfinding system wherein a shorting cap or a photocontroller enclosure plugs into a wayfinding circuitry enclosure, and the wayfinding circuitry enclosure plugs into a street light.

FIG. 3a shows a third configuration for the emergency wayfinding system 300a. Like the embodiment shown in FIG. 3, an electrical cap 305a is installed into a wayfinding circuitry enclosure 310a via a twist-lock plug 315a. The wayfinding circuitry enclosure 310a comprises a second twist-lock plug 320a that may be installed into a twist-lock socket 380a of a street lamp and draw electricity therefrom. The twist-lock plugs 315a, 320a facilitate the transmission of electricity between the electrical cap 305a, the wayfinding circuitry enclosure 310a, and the street light 325a. In the case that electrical cap 305a is a photocontroller, the twist-lock plugs 315a, 320a facilitate light emission brightness and on/off control of the street light 325a by the photocontroller via the twist-lock socket 380a. In some such cases, electrical cap 305a photocontroller aids lighting circuit 340a of the wayfinding circuitry enclosure 310a in controlling the light emission of at least one light emitting element 345c, 345d. Light emitting elements 345c, 345d are disposed on the wayfinding circuitry enclosure 310a and are communicatively connected to a communications circuit 350a and the lighting circuit 340a. In the embodiment shown, the communications circuit 350a is housed by the wayfinding circuitry enclosure 310a. The communications circuit 350a includes a wide area communications device 170a, and may also include a GPS unit 355a.

The communications circuit 350a may receive an over-the-air communication via the wide-area communications device 360a or, in some embodiments wide-area communications device 170, indicating that an emergency wayfinding light sequence or color should be emitted by the at least one light emitting element 345c, 345d. The communications circuit 350a relays this communication to the lighting circuit 340a, where a control scheme for executing a proper lighting sequence 135 and color is generated. The lighting control scheme is then executed by the lighting circuit 340a of the wayfinding circuitry enclosure 310a and drives the at least one light emitting element 345c, 345d, to turn on or off, or to emit light in a sequence or color in keeping with the control scheme devised by the lighting circuit 340a. In some embodiments, it is also possible that the electrical cap 305a, when it is a lighting controller enclosure 305, generates a control signal or message for the control of a light emitting element in a device such as the street light 325a into which the second twist-lock plug 320a of the emergency wayfinding circuitry enclosure 310a is installed. In such cases, the electrical cap 305a photocontroller acts, by way of twist-lock plug 315a and second twist-lock plug 320a, as power limiter for a light emitting device of the street light 325a. In some embodiments, the electrical cap 305a is a shorting cap that mimics a the electrical load of a lighting controller 335 (photocontroller or smart controller) such that the wayfinding circuitry enclosure 310a or the street light 325a operate accordance with at least one of the descriptions thereof herein.

In the embodiment shown, the wayfinding circuitry enclosure 310 includes an auxiliary power source 370, for example, a battery or a connection to a power source beside the twist-lock receptacle of the street light 325. The auxiliary power source 370 is configured to deliver electricity (e.g., power) to the lighting circuit 340 and communications circuit 350 when electricity is not being drawn through the second twist-lock plug 320. In embodiments wherein the auxiliary power source 370 is a battery, the auxiliary power source may be configured to charge when electricity is being drawn through the second twist-lock plug 320.

Figure 4:
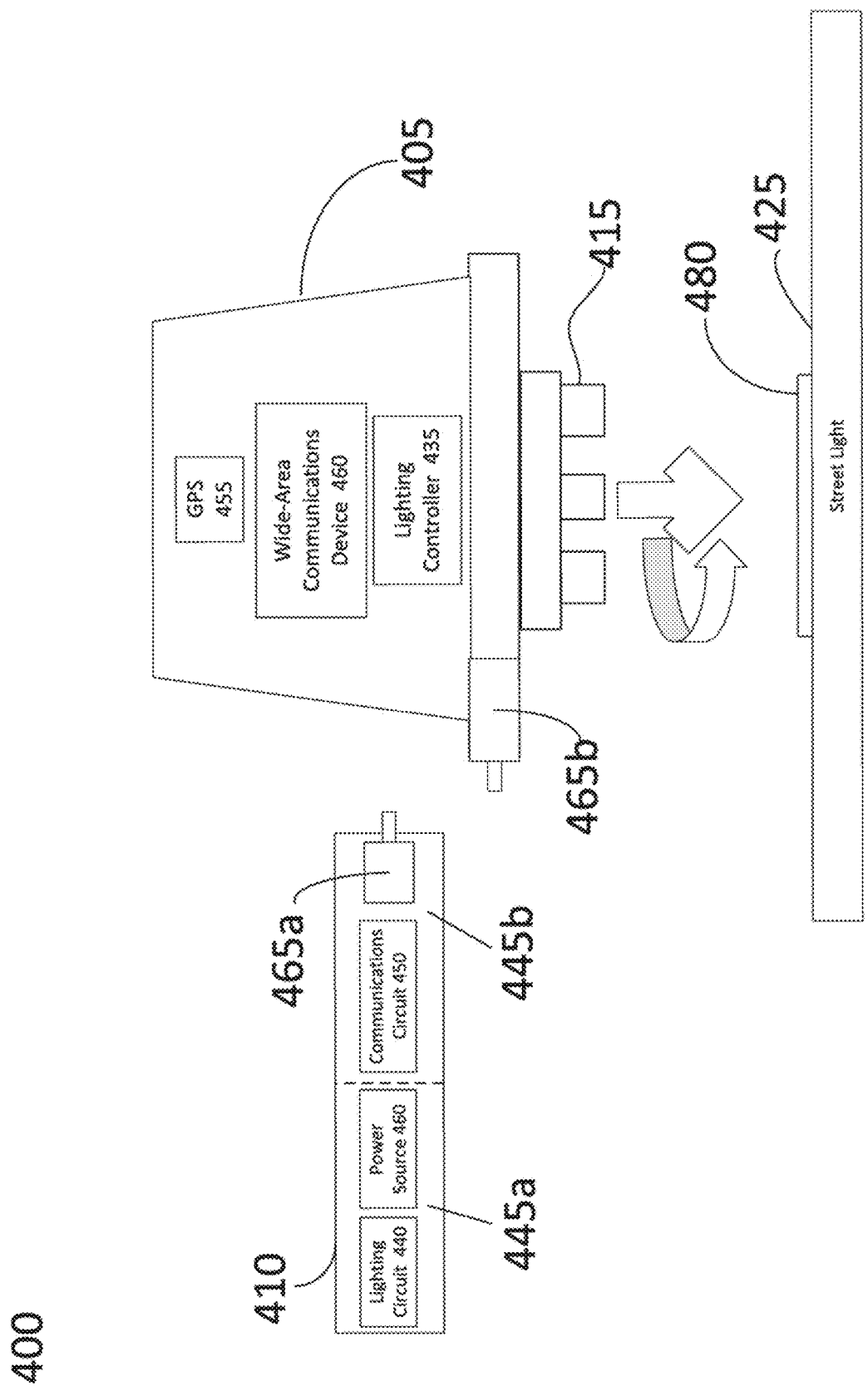
FIG. 4 depicts an emergency wayfinding system including a smart lighting controller.

FIG. 4 shows a fourth configuration for the emergency wayfinding system 400. In the embodiment shown, the emergency wayfinding system 400 includes two separate enclosures that do not plug into one another—a lighting controller enclosure 405 and a wayfinding circuitry enclosure 410. The lighting controller enclosure 405 includes a lighting controller 435, a lighting input/output port 430a, a power source 460, and at least one light emitting element 445a capable of emitting colored visible light. The lighting controller enclosure 405 may also include a GPS unit 455 and a wide-area communications device 460. The wayfinding circuitry enclosure 410 includes a communications circuit 450, a lighting circuit 440, a power source 460, and a bi-directional data transfer device 465a, for example, a bi-directional optical link. The lighting controller enclosure includes a wide-area communications device 460, a lighting circuit 440, for example, a photocontroller or a smart lighting controller, a bi-directional data transfer device 465b, and, in the embodiment shown, a GPS unit 455. The lighting controller enclosure 405 also includes a twist-lock plug 415, through which electricity is drawn from a street light 425 to power the wide-area communications device 460, the lighting controller 435, the bi-directional data transfer device 465b, and when present, the GPS unit 455, when the twist-lock plug 415 is inserted into a twist-lock receptacle (not shown). In this embodiment, the lighting controller enclosure 405 and wayfinding circuitry enclosure 410 communicate with one another by way of the bi-directional data transfer device 465a of the lighting controller enclosure 405 sending messages or signals to and receiving messages or signals from the bi-directional data transfer device 465b of the wayfinding circuitry enclosure 410, and vice versa. This message or signal transmission between bi-directional data transfer devices 465a and 465b often occurs over a wireless connection but may also occur via a wired connection.

The wide-area communications device 460 of the lighting controller enclosure 405 may receive an over-the-air communication indicating that an emergency wayfinding light sequence or color should be emitted by the at least one light emitting element 445a or 445b. The wide-area communications device 460 of the lighting controller enclosure 405 relays this communication to the lighting circuit 440, where a control scheme for executing a proper lighting sequence 135 and color is devised. The control scheme is executed by the lighting circuit 440 and drives the at least one light emitting element 425a, or 425b, to turn on or off, emit light in a sequence or color in keeping with the devised control scheme. In embodiments wherein lighting controller 435 is a photocontroller, a devised control scheme may be limited to causing a blinking of the at least one light emitting element 445a, 445b. It is also possible, in some embodiments, that the lighting controller 435 generates a control signal or message for the control of a light emitting element in a device such as the street light 425 into which the twist-lock plug 420 of the lighting controller enclosure 405 is installed.

In the embodiment shown, the wayfinding circuitry enclosure 410 includes integrated light emitting elements 445a and 445b that are configured to illuminate specific sections of the wayfinding circuitry enclosure 410 by using those sections of the wayfinding circuitry enclosure 410 as a diffuser for the integrated light emitting elements 445a and 445b. This per-section illumination of the wayfinding circuitry enclosure 410 can be used to ensure visibility to individuals travelling in one direction with respect to the wayfinding circuitry enclosure 410 while occluding visibility to individuals traveling in a second directions with respect to the wayfinding circuitry enclosure 410. For example, integrated light emitting element 445a may be configured to emit a light visible only to individuals viewing the wayfinding circuitry enclosure 410 from the south, while integrated light emitting element 445b may be configured to emit a light visible only to individuals viewing the wayfinding circuitry enclosure 410 from the north. In this way, if the wayfinding circuitry enclosure 410 is positioned on a road with northbound and southbound traffic, the integrated light emitting elements 445a and 445b can be used to signal northbound and southbound traffic separately.

In the embodiment shown, the wayfinding enclosure 410 is powered by a power source independent of the twist-lock plug 415 of the lighting controller enclosure 405. The wayfinding circuitry enclosure 410 is therefore mountable on a surface remote from the twist-lock plug receptacle of the street light 425. For example, the wayfinding circuitry enclosure 410 may include as power source 460 a rechargeable battery or a renewable resource such as a photovoltaic cell. In this way, the wayfinding circuitry enclosure 410 can be mounted on the supporting structure for the street light 425 or on a structure remote from the twist-lock plug receptacle of the street light 425, so long as the bi-directional data transfer device 465*b* of the lighting controller enclosure 405 and the bi-directional data transfer device 465*b* of the wayfinding circuitry enclosure 410 are capable of communicating with one another.

Figure 5:
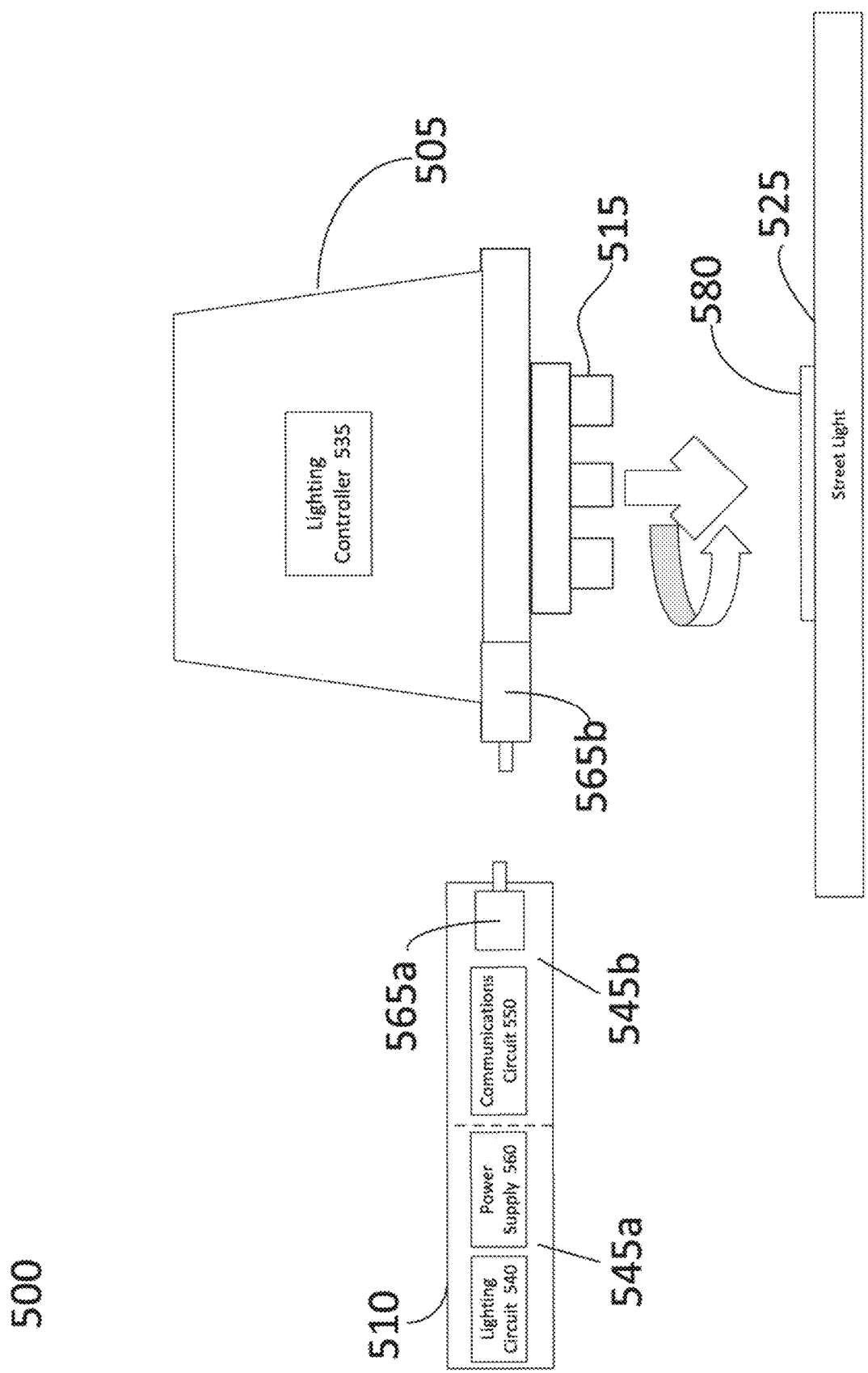
FIG. 5 depicts an emergency wayfinding system including a photocontroller.

FIG. 5 shows a fifth configuration for the emergency wayfinding system 500. In the embodiment shown, a wayfinding circuitry enclosure 510 comprises a lighting circuit 540, a power source 560, integrated light emitting elements 545*a* and 545*b*, a communications circuit 550, and a bi-directional data transfer device 565*a*. As shown in FIG. 1, the communications circuit 550 may comprise a GPS unit 175 configured to perform a self-locating of the wayfinding circuitry enclosure 510. One or more light emitting element 545*a* and 545*b* capable of emitting colored visible light is connected to the wayfinding circuitry enclosure 510, the lighting circuit 105, and the communications circuit 110. The power source 520 may comprise a battery, a source of renewable energy, or some other power source, and each component connected to the wayfinding circuitry enclosure 510 may be powered via electricity provided by the power source 520.

In the embodiment shown, the wayfinding system 500 is configured to communicate with a lighting controller enclosure 505 equipped with a lighting controller 535, such as a photocontroller without wide-area communications device 460. However, the wayfinding system 500 shown may also communicate with a lighting controller enclosure 405 that includes a wide-area communications device 460. The communications circuit 550 is used to receive an over-the-air communication. The communications circuit 550 relays this communication to the lighting circuit 540, where a control scheme for executing a proper lighting sequence 135 and color is devised. The control scheme is executed by the lighting circuit 540 and drives at least one light emitting element 525*a* or 525*b*, to turn on or off, emit light in a sequence or color in keeping with the devised control scheme. In embodiments wherein lighting controller 535 is a photocontroller with no wide area communications device, a devised control scheme may be limited to causing a blinking of the at least one light emitting element 525*a* or 525*b*. It is also possible, in some embodiments, that the lighting controller 535 generates a control signal or message for the control of a light emitting element in a device such as the street light 525 into which the twist-lock plug 515 of the lighting controller enclosure 505 is installed.

Being that this configuration of the emergency wayfinding system 500 packages the lighting circuit 105, communications circuit 110, and the power source 520 together, the emergency wayfinding circuitry enclosure 510 may be mounted in indoor and outdoor areas where a twist-lock plug receptacle is not present.

Figure 6:
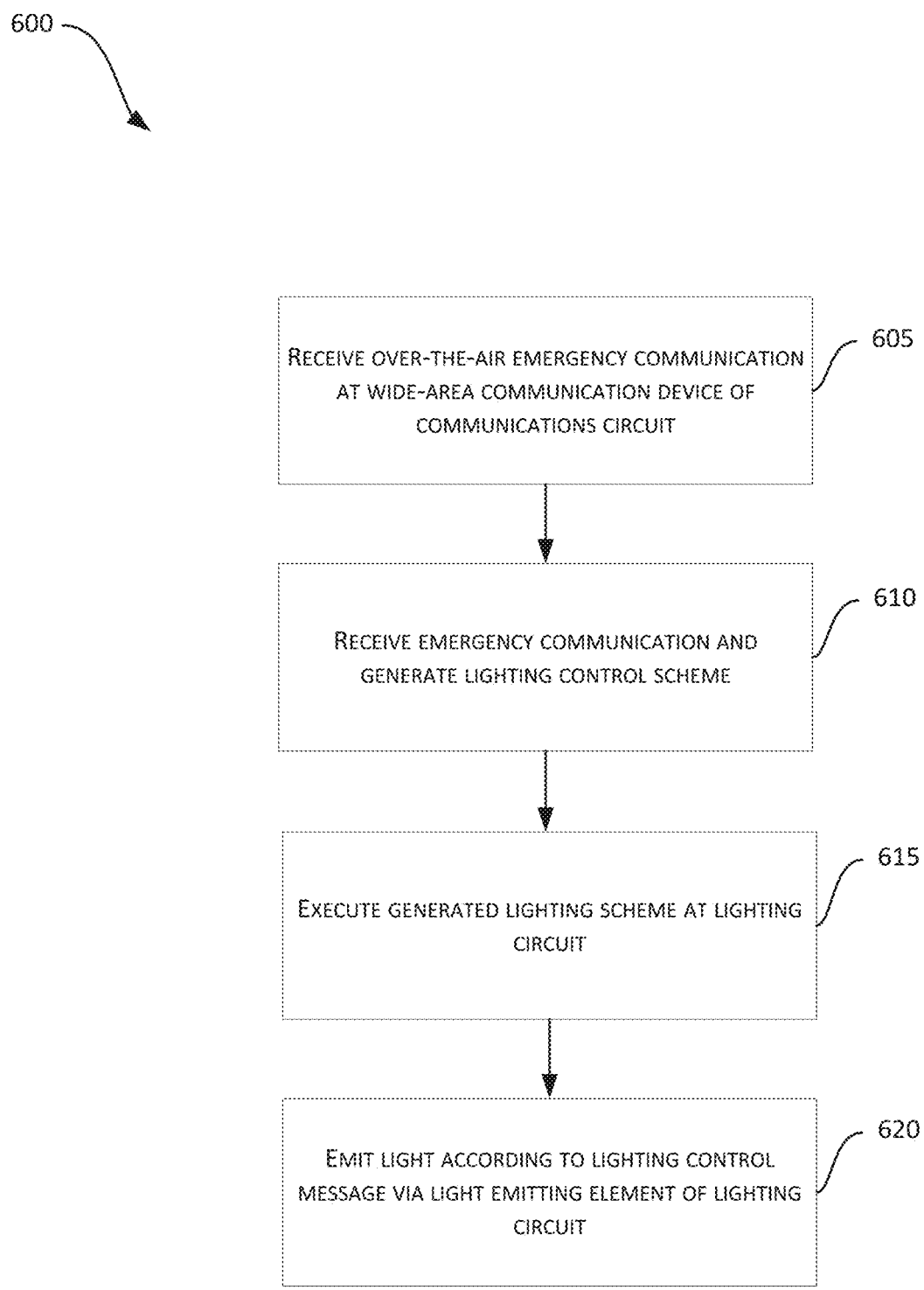
FIG. 6 depicts a flowchart for providing emergency guidance to vehicles and pedestrians using an emergency wayfinding system.

FIG. 6 depicts a flowchart 600 for providing emergency guidance using a lighting sequence 135 executed by electronic processor 115 according to several embodiments. Flowchart 600 is described with respect to the systems 500 of FIGS. 1-5. However, in some embodiments, the flowchart is implemented by other systems.

At block 605, the wide-area communications device 170 receives an over-the-air emergency communication indicating an emergency condition. This over-the-air emergency communication may occur by optical link such as a bi-directional infrared link, by radio communication, cellular communication, or other types of wide-area communications. As described above, the wide-area communications device 170 may be equipped to receive such wide-area communications, process them, and relay them to the electronic processor 115. The relayed emergency communication may contain information sufficient for lighting circuit 540 to generate a lighting control scheme that causes the electronic processor 115 to use an emergency code 140 or lighting sequence 135 from memory 120. The emergency communication may also itself contain an emergency code 140 or lighting sequence 135 for use by the electronic processor 115.

At block 610, the wide-area communications device 170 relays the received emergency communication to the lighting circuit 540. The lighting circuit 540 generates a lighting control scheme based upon the received emergency communication. The lighting control scheme may comprise a lighting sequence 135 to be executed by a lighting circuit 540 of the emergency wayfinding system 500 thereby driving the at least one light emitting element 545*a* or 545*b* to light in a particular sequence or with a particular color. For example, the emergency communication may be communicated to emergency wayfinding systems installed in street lights 225 along a congested road and contain information that will cause the lighting circuit 540 to generate a lighting control scheme that the lighting circuit 540 executes and drives the at least one light emitting element 545*a* or 545*b* to directionally blink in a red color, thereby indicating to vehicles or traffic approaching from that direction that the road is congested. As another example, the emergency communication may be communicated to emergency wayfinding systems installed in street lights along a vacant road and contain information that will cause the lighting circuit 540 to generate a lighting control scheme that the lighting circuit 540 to drive the at least one light emitting element 545*a* or 545*b* to light directionally in a solid green color, indicating to vehicles or traffic approaching from that direction that the road is vacant and free for passage. As yet another example, the emergency communication may be communicated to wayfinding circuitry enclosures 510 mounted walls along a city street and contain information that will cause the lighting circuit 540 to generate a lighting control scheme that the lighting circuit 540 executes and drives the at least one light emitting element 545*a* or 545*b* to slowly blink in a yellow color, indicating to approaching vehicles or traffic that the road is not necessarily vacant or free and clear for travel. As alluded to above, these emergency communications may be directed at specific emergency wayfinding systems configuration or groups of wayfinding systems. To that end, a GPS unit 455 unit of an emergency wayfinding system 500, where present, as well as any self-identifying information provided by the electronic processor 115, memory 120, wide-area communications device 170, or any other communications chip or radio disclosed above may aid in such an emergency communication broadcasting scheme.

At block 615, the lighting controller 535 executes the lighting scheme in light of lighting sequence 135 and emergency code 140 data stored in memory 120. Such data may need to be retrieved from memory 120 for execution of the lighting control message by the lighting circuit 105. After generating the lighting control scheme and, in some embodiments, retrieving or receiving additional data (e.g., lighting sequence 135, emergency code 140, etc.), the lighting circuit 540 drives the light emitting element 525*a* or 525*b* to emit light according to a sequence or with a particular color or set of colors specified in the lighting control scheme.

To that end, at block 620, the lighting circuit 105 may drive the light emitting element 545*a* or 545*b* to glow in a solid red color directionally, thereby indicating to vehicles or pedestrians approaching from that direction that the road is congested, to blink in a green color directionally thereby indicating to approaching vehicles or pedestrians that the road is vacant or free for passage, to glow in a solid yellow color directionally thereby indicating to approaching vehicles or pedestrians that the road may be congested and not clear for passage. Other, non-intuitive indications by the emergency wayfinding systems 500 are also contemplated. As an example, the lighting circuit 105 may drive at least one light emitting element 545*a* or 545*b* to glow in a solid purple color to indicate that the path or road along which the emergency wayfinding systems 500 are located is free for passage of pedestrians only and not to vehicles. Similarly, the lighting circuit 105 may drive at least one light emitting element 545*a* or 545*b* to glow in a solid orange color to indicate that the path or road along which the emergency wayfinding systems 500 are located is free for passage of vehicle only and not to pedestrians.

It should be apparent that the lighting sequences 135, schemes, and colors described herein are simply intended to give examples of the capabilities of the disclosed emergency wayfinding systems and not to give a comprehensive enumeration of possible lighting schemes, sequences, or colors. Further, it should be noted that each lighting sequence 135, pattern, or color of light emitted by the emergency wayfinding device may each be associated with an emergency code 140. A plurality of emergency codes 140 may exist, each for a different type of emergency. For example, an emergency code of 'A1' may be reserved for an emergency of national security in the form of a ground invasion; an emergency code of 'A2' may be reserved for an emergency of national security in the form of an aerial attack; an emergency code of 'B1' may be reserved for a natural disaster emergency in the form of a tornado; an emergency code of 'B2' may be reserved for a natural disaster in the form of a blizzard; and, so forth. Each of these emergency codes 140 may be associated with a particular lighting sequence 135, pattern, or color, and therefore apprise the public of the type of emergency being indicated. Further, the emergency codes 140, being associated with a type of emergency, may cause numerous emergency wayfinding systems 500 to collaborate in properly directing traffic and pedestrians to safe havens, properly directing emergency crews to the site of an emergency, or properly directing vehicles and pedestrians to halt travel or abandon paths or roads altogether. Emergency wayfinding systems 500 may communicate to one another and one or more centralized broadcasting devices or stations via a wide-area communications device 460. The emergency wayfinding systems 500 may also communicate with each other via short-range communication devices or protocols, or through wires or electrical contacts.

It should also be apparent that one or more light emitting element 545*a* or 545*b* may comprise a fluorescent lamp, and incandescent lamp, a single-color led, a bi-color led, a tricolor led, etc. Where a certain color is desired for the execution of a lighting sequence 135, the lighting circuit 540 may be configured to drive the emission of light from a single-color light or lamp light emitting element 545*a* or 545*b* regardless of the light or lamp's color, or to selectively drive the single-color light or lamp's emission of light in response to a control command to execute a lighting sequence 135.

It is contemplated that whenever the lighting circuit 540 and the communications circuit 550 communicate with one another, the communication may occur via a wired or wireless connection. It is also contemplated that the lighting circuit 540 and the communications circuit 550 may be disposed on the same device or be two segments of the same circuit. It is further contemplated that the components of the communications circuit 550 may have access to the contents of memory 120 in some embodiments. To that end, it is contemplated that memory 120 may be updated by communications circuit 550 and the emergency wayfinding systems 500 may thereby also receive over-the-air updates to emergency codes 140, lighting sequences 135, power source attributes 145, or any other data or software stored in memory 120.

It is also contemplated that the emergency wayfinding devices disclosed herein may be installed in the twist-lock electrical receptacles of street lights. However, certain embodiments account for power sources other than a twist-lock receptacle of a street light, and thus the installation of emergency wayfinding devices in places other than plugged into street lights is contemplated, for example, embodiments wherein at least part of the wayfinding device (e.g. the lighting controller enclosure 505, the wayfinding circuitry enclosure 510, the lighting circuit 105, or the communications circuit 110) is positioned on an overhead powerline or transformer and configured to draw or leech power therefrom.

Various features and advantages of the invention are set forth in the following claims.

The invention claimed is:

1. An emergency wayfinding lighting unit comprising:
at least one processor;
memory in communication with the at least one processor;
a lighting controller in communication with the processor;
a wide-area network communication device in communication with the at least one processor; and
a light emitting device in communication with the lighting controller,
a pre-programmed wayfinding lighting sequence is stored in the memory
wherein the at least one processor executes the wayfinding lighting sequence to instruct the lighting controller to change at least one property of light emitted from the light emitting device based on the wayfinding lighting sequence, and
wherein execution of the wayfinding lighting sequence is triggered by a communication received from the wide-area network communication device.

2. The emergency wayfinding lighting unit of claim 1, wherein the at least one processor and the wide-area network communication device are positioned in a first enclosure and the first enclosure is connected to the light emitting device via a twist-lock plug.

3. The emergency wayfinding lighting unit of claim 1, further comprising a GPS unit configured to provide location data to the memory.

4. The emergency wayfinding lighting unit of claim 1, wherein the wayfinding lighting sequence includes instructions to emit light of different colors.

5. The emergency wayfinding lighting unit of claim 1, wherein the memory includes an emergency code associated with the wayfinding lighting sequence.

6. The emergency wayfinding lighting unit of claim 1, wherein the lighting controller is positioned in a first enclosure and the at least one processor is positioned in a second enclosure.

7. The emergency wayfinding lighting unit of claim 6, wherein the first enclosure is connected to the second enclosure via a twist-lock plug.

8. The emergency wayfinding lighting unit of claim 6, wherein the first enclosure is connected to the second enclosure via a bi-directional data transfer device.

9. The emergency wayfinding lighting unit of claim 6, wherein the memory is positioned in the second enclosure.

10. An emergency wayfinding lighting unit comprising:
a lighting circuit including at least one processor and a first input/output interface;
a communication circuit including a wide-area network communication device, a lighting controller, and a second input/output device in communication with the first input/output device; and
a light emitting device in communication with the lighting controller,
wherein the at least one processor executes the wayfinding lighting sequence to instruct the lighting controller to change at least one property of light emitted from the light emitting device based on the wayfinding lighting sequence, and
wherein execution of the wayfinding lighting sequence is triggered by a communication received from the wide-area network communication device.

11. The emergency wayfinding lighting unit of claim 10, wherein the first input/output device and the second input/output device are in communication via a wireless communication channel.

12. The emergency wayfinding lighting unit of claim 10, further comprising memory in communication with the at least one processor, the memory storing the wayfinding lighting sequence.

13. The emergency wayfinding lighting unit of claim 10, wherein the lighting circuit and the communication circuit are in an enclosure and the enclosure is connected to a street light.

14. The emergency wayfinding lighting unit of claim 13, wherein the enclosure is connected to the street light via a twist-lock connection.

15. An emergency wayfinding lighting unit comprising:
a first enclosure including a network communication device and a lighting controller;
a second enclosure including a lighting circuit having at least one processor and memory in communication with the at least one processor;
a light emitting device connected to the second enclosure and in communication with the lighting controller,
wherein
a pre-programmed wayfinding lighting sequence is stored in the memory
wherein the at least one processor executes the wayfinding lighting sequence to instruct the lighting controller to change at least one property of light emitted from the light emitting device based on the wayfinding lighting sequence, and
wherein execution of the wayfinding lighting sequence is triggered by a communication received from the network communication device.

16. The emergency wayfinding lighting unit of claim 15, wherein the first enclosure includes a first bi-directional data transfer port and the second enclosure includes a second bi-directional data transfer port and wherein the first bi-directional data transfer port and the second bi-directional data transfer port facilitate data transfer between the first enclosure and the second enclosure.

17. The emergency wayfinding lighting unit of claim 15, wherein the first enclosure is connected to the second enclosure via a twist-lock connection.

18. The emergency wayfinding lighting unit of claim 15, wherein the first enclosure and the second enclosure are connected to a street light.

19. The emergency wayfinding lighting unit of claim 15, wherein the first enclosure includes a GPS device.

20. The emergency wayfinding lighting unit of claim 15, wherein the network communication device is a wide-area network communication device.

* * * * *